United States Patent Office 2,762,714
Patented Sept. 11, 1956

2,762,714
METHOD OF MAKING SILVER MIRRORS ON GLASS

Earl R. Smith and John V. Fitzgerald, New Kensington, Pa., assignors to Pittsburgh Plate Glass Company No Drawing. Application April 10, 1952, Serial No. 281,666

27 Claims. (Cl. 117—35)

This invention pertains to a method of coating objects with a tenacious layer of one of the precious metals. The objects to be coated may be composed of glass or ceramics of a like nature, or metals such as steel or brass.

The coating method of this invention lends itself to the production of mirrors with unusual qualities and to the improving of silvered mirrors as heretofore produced.

Another use of this invention is for coating metallic objects to protect them from weathering as well as for ornamental purposes.

Another object of this invention is to provide a mirror-like deposit of one of the precious metals on the surface of objects, which deposit will not conduct electricity. The deposit of this invention has the further advantage of being very tenaciously bonded to glass and other ceramics as well as to metallic objects.

Another object is to provide a means of accurately reducing the reflectivity of commercial silvered glass mirrors while at the same time giving a superior bonding of the silver layer to the glass.

Still another object is to provide a method of recovering various precious metals from a dilute solution of the same for the purpose of recovering the precious metal. Such recovery might be accomplished from the ocean or might be used to prevent waste in mining or metallurgical operations.

The primary steps of the method of our invention are as follows: the object to be coated should be cleaned to remove all grease or foreign matter of any sort, then, beginning with a clean glass or metal object, (1) it is dipped into a weak solution of stannous chloride (Sn $Cl_2$), next, (2) it is rinsed in running tap or distilled water, then, (3) it is dipped in a weak solution of a precious metal salt, e. g. silver nitrate (Ag $NO_3$) solution or gold chloride (Au $Cl_3$) solution or platinum chloride solution, or iridium trichloride solution or ruthenium trichloride solution or rhodium trichloride solution, or osmium trichloride solution, and finally (4) it is rinsed again in running water.

These four steps are repeated again any desired number of times in the same sequence and there is gradually built up a layer of a metallic appearing deposit. We have discovered that this deposit does not conduct electricity but gives an X-ray pattern of the metal, the salt of which was used as the second dip in the cycle. This deposit is tenaciously bonded to the object being coated whether the object is a ceramic material, such as glass, or is a metal such as steel or brass.

When the object to be coated is glass, a most satisfactory way of cleaning the surface, before beginning the four primary dip and rinse steps just described, is that of scouring the surface with cerium oxide paste. Any means of cleaning the surface of the object to be coated which will effectively remove all grease and dirt, would be satisfactory.

The primary process may be used to make mirrors by coating glass plates, using the steps just described. Following a sufficient number of complete dip cycles—each cycle beginning with the stannous chloride dip and ending with the rinse after the precious metal salt solution dip—one side of the glass plate is abraided as, for example, by using a block of cerium oxide until the coating is entirely removed. The leaves an impervious coating on the other side only. The mirror thus formed has a very tenaciously bonded metal coating which has the unusual property of being non-conductive to electricity. The number of dip cycles used to make a mirror by this process will vary somewhat, depending upon the concentrations used in the two solutions involved.

A specific example of the process as it was carried out in making mirrors is as follows: A 4" x 4" x ¼" polished tank plate glass specimen was hand blocked with cerium oxide paste, washed and rinsed with distilled water. It was held with a small pair of laboratory tongs and dipped into a 2000 ml. beaker of freshly made 0.1% $SnCl_2$ solution. Next, it was washed with running tap water and rinsed with distilled water. It was then dipped in a 2000 ml. beaker of ½% $AgNO_3$ solution, washed and rinsed as above. The process was repeated starting with the $SnCl_2$ dip. After three to seven cycles, a yellowish or amber color became visible. After 20 dips, the deposit appeared metallic. After 100 dips, the deposit would transmit only very bright light such as a tungsten filament or the sun. The deposit was removed from one of the surfaces by vigorous blocking with cerium oxide so as to expose the other surface as a back reflecting mirror.

Another process of this same invention which involves the same primary steps, is that of making a darkened mirror. It was discovered that a commercial sugar reduction process for silvering one face of a glass plate to make a mirror could be used to silver over a more or less dense coating of the precious metal as built up by the primary process of this invention. The result is to produce a more or less darkened mirror. The darkness may be very exactly controlled by the number of dip cycles which are used in the coating preceding the commercial silvering process.

The complete process of making darkened mirrors involves the following steps: first, using a clean glass plate, a predetermined number of complete dip cycles of the four primary steps described above are carried out. The number of cycles will determine the darkness of the final mirror. Second, one face of the plate is then given a silver coating by a commercial sugar reduction process right over the coating of precious metal which was built up by the dip cycles first applied. Third, the opposite face of the plate is then abraded clear by using any suitable abrasive. The second and third steps just recited may be interchanged in their order or might be carried out simultaneously.

The commercial sugar reduction process referred to entails application of a mixture of ammoniacal silver nitrate and reducing sugar solution to one surface of a glass plate. The solution turns from black to brown to gray as the silver is converted into a metallic state and is deposited upon the surface of the glass. A Rochelle Salts solution is sometimes used in place of reducing sugar.

Some of the beneficial results of using this method of making darkened mirrors include the reduction of the length of time involved in completing the commercial sugar reduction step of silvering one face, and also the commercial silvered coat is more tenaciously bonded to the glass than is true in the absence of the darkening pre-coat.

Specific examples of darkened mirrors having varying degrees of darkness were obtained by carrying out the steps set forth above. Three mirrors of varying darkness were made by giving the glass plates 3, 10 and 30 dip cycles respectively and the reduction in reflectivity or the darkness of each mirror was increased progressively from slightly dark to very dark. The solution concentrations used were the same as those given in the specific example set forth above in connection with the primary steps and as used in making mirrors.

In carrying out the primary steps of this invention, the concentrations of the solutions used may be varied. An example of very satisfactory concentrations is as follows: 0.1% stannous chloride solution and 0.5% silver nitrate solution, the percentage concentration being by weight in each case. The process is preferably carried out cold, i. e. at room temperature.

Although stannous chloride solution is used as the reducing salt, other reducing salts may be used, e. g. cobaltous chloride. We prefer to use a stannous chloride solution, especially when coating glass because the tinning effect or adherence of the stannous chloride to the glass seems to be superior.

The exact nature of the chemical action which takes place in the course of this process is not known to us. However, it seems apparent that there is a certain amount of adherence or "tinning" action of the reducing salt solution upon the dipping in this solution, so that there is present some of this solution after the succeeding rinse in water. This remaining solution apparently reacts with the precious metal salt solution when the dip in such solution is made, converting the soluble precious metal salt to an insoluble one and also, upon succeeding steps in the repeated cycles, reducing at least part of the insoluble precious metal salt to its free metallic state. The particles of free metal which are deposited apparently are separated by the insoluble salts so that the layer of free metal built up has the electrically insulating effect of the insoluble salts which separate each particle of free metal from its neighbor. Another way of expressing the theory of the chemical action involved, where stannous chloride is used as the reducing salt solution and silver nitrate is used as the precious metal salt solution ad glass is used as the object to be coated with a silver deposit, is as follows:

Reduced $Sn^{++}$ ions are adsorbed in the strong attractive surface field of the glass. It is this close proximity to the surface which explains the good adhesion. These adsorbed $Sn^{++}$ ions reduce the silver ions in the applied solution to silver metal, but here also in the strong attractive surface field of the glass. On repeated dippings more tin and more silver are deposited. In this almost two dimensional surface field, the silver atoms are mobile, migrating to form silver clusters or grains which grow to colloidal dimensions, as shown by the blue and/or purple color of the produced film. These colloidal particles are separated by non-conducting and insoluble areas and films of unknown composition, possible $AgOCl$ or $SnOCl_2$.

The electrical resistance of the metallic coating on glass as formed by the basic steps of this invention, is very high as was mentioned above. It has been found that the electrical resistance of the silver coat of a commercially produced (sugar reduction process) mirror, by way of comparison, is 0.1 ohm per square unit; while the resistance of a mirror made only by the basic dip process of this invention (where the number of dips was sufficient to make the coating impervious to bright light) was $2.7 \times 10^9$ ohms per square unit.

As has been mentioned above, the primary process of this invention may be valuable in coating metal articles, such as steel or brass to protect them from weathering. Where this coating process is applied to ceramic materials, the purpose might be to give a decorative effect. The very tenacious bonding which is obtained is particularly beneficial in most applications of this invention.

Another process which is embraced by our invention is that of recovering precious metals where they exist in the form of very dilute solutions of a salt of the precious metal. For example, the ocean is reported to contain as much as two grams of silver per ton of sea water, and this may be recovered by using the primary steps of this invention (in which glass is being immersed in the solutions) and following the coating of the glass with silver, by washing the glass in concentrated nitric acid to recover the silver. One specific apparatus which may be used to carry out the recovery of a precious metal from a dilute salt solution of the metal is that of using a bed of glass beads. The first step is to immerse the beads in a dilute solution of stannous chloride, then the beads will be rinsed in water, then the beads will be immersed in the dilute salt solution of the precious metal which allows the precious metal to deposit on the beads, and finally, after repeating these steps to build up a given thickness of coating of the precious metal on the beads, they will be washed with concentrated nitric acid to recover the precious metal. This process is also applicable to the recovery of silver and other precious metals from mine and metallurgical waste waters.

While we have disclosed the process with such steps and details as we now regard as preferable, those skilled in the art will understand that variations of the steps and substitution of equivalent materials may be made without departing from the spirit of this invention. We, therefore, rely on the following claims to fix the scope of our invention.

We claim:

1. The method of coating ceramic materials or metals with an electrically non-conductive tenacious coating of a precious metal which comprises immersing the material to be coated in a solution of a reducing salt, rinsing in water, immersing in a salt solution of the precious metal having substantially no reducing agent therewith, rinsing in water, and repeating the preceding steps in sequence for a predetermined number of cycles.

2. The process of coating a solid article which comprises repeatedly dipping it in a salt solution of a precious metal having no reducing agent in said solution to produce an electrically non-conductive tenacious coating of the precious metal thereon.

3. The process of coating ceramic materials or metals with an electrically non-conductive tenacious coating of a precious metal which comprises immersing the material to be coated in a solution of a reducing salt having a tinning effect on the material to be coated, rinsing in water, immersing in a salt solution of the precious metal, said precious metal salt solution containing no reducing agent, rinsing in water, and repeating the preceding steps in sequence for a predetermined number of cycles.

4. The method of coating metals or ceramic materials with a non-conductive tenacious coating of a precious metal which comprises immersing the material to be coated in a solution of stannous chloride, rinsing in water, immersing in a salt solution of the precious metal, said precious metal salt solution containing no reducing agent, rinsing in water, and repeating the preceding steps in sequence for a predetermined number of complete cycles.

5. The method as set forth in claim 4 wherein said precious metal is silver and said salt solution is silver nitrate solution.

6. The method as set forth in claim 4 wherein said precious metal is gold and said salt solution is gold chloride solution.

7. The method as set forth in claim 4 wherein said precious metal is platinum and said salt solution is platinum chloride solution.

8. The method of making mirrors, comprising, taking a clean glass plate, immersing said glass plate in a solution of a reducing salt which will adhere to the glass, rinsing the plate in water, immersing the plate in a precious metal salt solution, said precious metal salt solution containing no reducing agent, rinsing the plate in water, repeating the previous steps in sequence for a predetermined number of cycles, and then abraiding one face of the plate to remove the coating of precious metal which was deposited thereon.

9. The method of making mirrors, comprising, taking a clean glass plate, immersing said glass plate in a solution of stannous chloride, rinsing the plate in running water, immersing the plate in a precious metal salt solution, said precious metal salt solution containing no reducing agent, rinsing the plate in running water, repeating the previous steps in sequence for a predetermined number of cycles, and then abraiding one face of the plate to remove the coating of precious metal which was deposited thereon.

10. The method as set forth in claim 9 wherein said precious metal salt solution is silver nitrate.

11. The method as set forth in claim 9 wherein said precious metal salt solution is gold chloride.

12. The method as set forth in claim 9 wherein said precious metal salt solution is platinum chloride.

13. The method of making a darkened mirror having a tenaciously bonded reflecting layer, comprising, immersing a clean glass plate in a solution of a reducing salt which will adhere to the glass, rinsing, immersing in a precious metal salt solution, said precious metal salt solution containing no reducing agent, rinsing, repeating this operation a predetermined number of times to give the desired darkness to the mirror, and then silvering one face of the glass plate by a commercial sugar reduction process, the other face of the plate being abraided to remove the precious metal coating which was built up.

14. The method of making a darkened mirror having a tenaciously bonded reflecting layer, comprising, immersing a clean glass plate in a solution of stannous chloride, rinsing, immersing in a precious metal salt solution, said precious metal salt solution containing no reducing agent, rinsing, repeating this operation a predetermined number of times to give the desired darkness to the mirror, and then silvering one face of the glass plate by a commercial sugar reduction process, the other face of the plate being abraided to remove the precious metal coating which was built up.

15. The method as set forth in claim 14 wherein said precious metal salt solution is silver nitrate.

16. The method as set forth in claim 14 wherein said precious metal salt solution is gold chloride.

17. The method as set forth in claim 14 wherein said precious metal salt solution is platinum chloride.

18. The method as set forth in claim 4 wherein said precious metal salt solution is selected from the group consisting of silver nitrate, gold chloride, platinum chloride, iridium trichloride, ruthenium trichloride, rhodium chloride and osmium trichloride.

19. The method as set forth in claim 4 wherein said precious metal salt solution is iridium trichloride.

20. The method as set forth in claim 4 wherein said precious metal salt solution is ruthenium trichloride.

21. The method as set forth in claim 9 wherein said precious metal salt solution is selected from the group consisting of silver nitrate, gold chloride, platinum chloride, iridium trichloride, ruthenium trichloride, rhodium chloride and osmium trichloride.

22. The method as set forth in claim 9 wherein said precious metal salt solution is iridium trichloride.

23. The method as set forth in claim 9 wherein said precious metal salt solution is ruthenium trichloride.

24. The method as set forth in claim 14 wherein said precious metal salt solution is selected from the group consisting of silver nitrate, gold chloride, platinum chloride, iridium trichloride, ruthenium trichloride, rhodium chloride and osmium trichloride.

25. The method as set forth in claim 14 wherein said precious metal salt solution is iridium trichloride.

26. The method as set forth in claim 14 wherein said precious metal salt solution is ruthenium trichloride.

27. An article produced by the method recited in claim 1.

References Cited in the file of this patent
UNITED STATES PATENTS

| Number | Name | Date |
|---|---|---|
| 354,343 | Pratt | Dec. 14, 1886 |
| 788,912 | Just | May 2, 1905 |
| 1,588,510 | Wear | June 15, 1926 |
| 1,865,417 | Zimmerman | June 28, 1932 |
| 1,935,520 | Peacock | Nov. 14, 1933 |
| 1,988,663 | Peacock | Jan. 22, 1935 |
| 2,183,202 | Misciattelli | Dec. 12, 1939 |
| 2,219,977 | Brill | Oct. 29, 1940 |
| 2,249,367 | Visser | July 15, 1941 |
| 2,647,068 | Patai | July 28, 1953 |